R. S. NEWTON.
HOSE AND COUPLING TESTING APPLIANCE.
APPLICATION FILED MAR. 7, 1914.
1,118,876.
Patented Nov. 24, 1914.
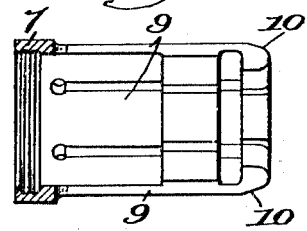
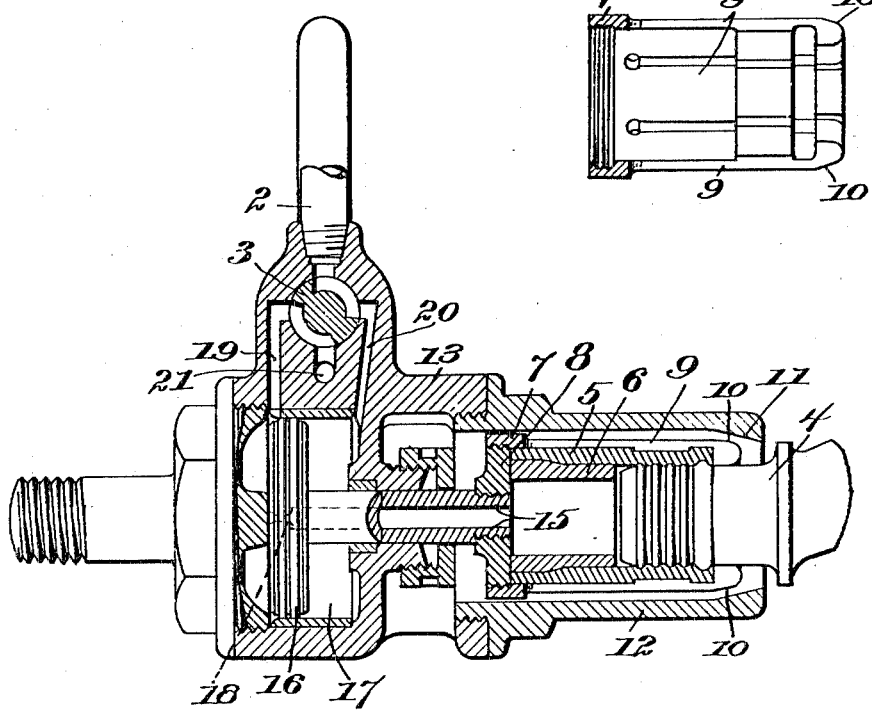
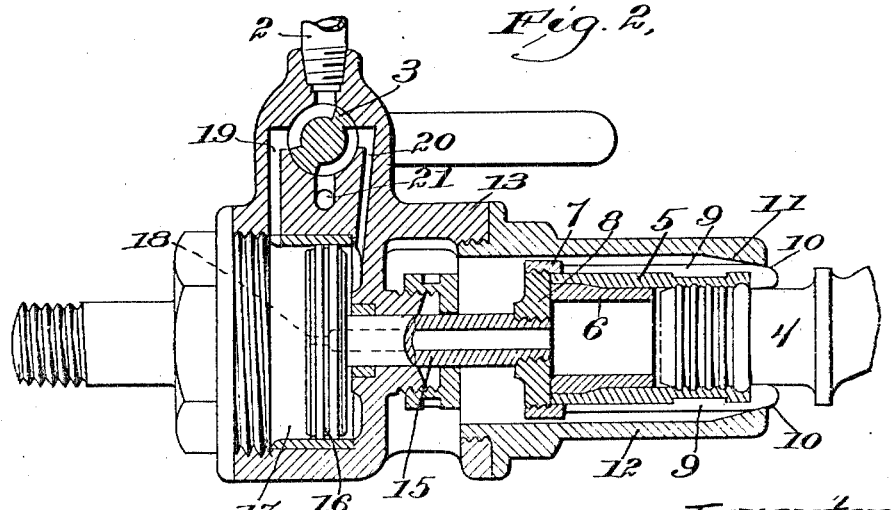

UNITED STATES PATENT OFFICE.

ROBERT SHEDROCK NEWTON, OF WATERTOWN, NEW YORK, ASSIGNOR TO NEW YORK AIR BRAKE COMPANY, A CORPORATION OF NEW JERSEY.

HOSE AND COUPLING TESTING APPLIANCE.

1,118,876.  Specification of Letters Patent.  Patented Nov. 24, 1914.

Application filed March 7, 1914. Serial No. 823,096.

*To all whom it may concern:*

Be it known that I, ROBERT SHEDROCK NEWTON, a citizen of the United States, residing in Watertown, in the county of Jefferson and State of New York, have invented an Improvement in Hose and Coupling Testing Appliances, of which the following description, in connection with the accompanying drawings, is a specification, like letters on the drawings representing like parts.

This invention relates to an appliance for testing hose by fluid pressure, and embodies instrumentalities which when applied to the nipple or coupling member of the hose to be tested is automatically clamped and sealed thereto by the pressure which is introduced for testing the hose and by which said coupling member is automatically ejected after the desired test has been made.

Figure 1 is a longitudinal section of the appliance with the parts in the position assumed when the appliance is to be applied to the coupling member of the hose to be tested, being also the position of the working parts for the ejecting operation after the test has been made; Fig. 2 is a similar section with the parts in the position for automatically clamping and sealing the testing device on the coupling member of the hose to be tested; and Fig. 3 is a sectional detail showing a portion of the clamping member of the testing device.

The appliance herein shown is intended for facilitating the operation of introducing fluid under pressure into a length of hose pipe including a nipple or hose clamping member for the purpose of testing the same for leakage and strength to withstand internal fluid pressure. The said appliance is connected as at 2 with a suitable source of air or other fluid under pressure to be used in the test and is provided with a suitable valve or stop cock 3 by which the admission and exhaust of the fluid may be controlled by the operator.

The provision for engaging and making a fluid tight or sealed connection with the nipple or coupling member 4 of the hose to be tested comprises a packing tube consisting of a piece of tubular fluid tight material such as a short length of hose pipe 5 of proper size to receive the end of the coupling member 4 within one end thereof, the other end being tightly clamped between an internal expander or short tube 6, and a clamping ring 7, mounted upon a carrying plate 8 with which the packing tube 5 is thus caused to make an air tight connection.

The forward end of the packing tube 5 which is to engage with the member 4 of the hose to be tested is surrounded by an expansible clamp or compressing device composed of a number of spring fingers 9 shown as extending from the clamping ring 7 which fingers are radially yielding, and when unconfined will spread or yield radially in order to admit of the clamping member 4 being easily inserted into the end of the yielding packing tube 5 as shown in Fig. 1. The said fingers 9 at their outer ends are inclined or cam shaped as shown at 10 and are contained within a surrounding tapering cam surface 11 formed at the end of a sleeve 12 connected with the body 13 of the testing appliance, said sleeve 12 being shown as surrounding and inclosing the yielding packing tube 5 and the clamping fingers 9 which parts with their supporting plate 8 are longitudinally movable in said sleeve 12. The said carrying plate 8 is connected by a rod or stem 15 with a piston 16 working in a cylindrical chamber 17 the said rod or stem 15 being tubular and there being a relatively small passage 18 through the piston which affords communication from the cylindrical chamber 17 at one side of said piston (the left hand side in the drawing) to the interior of the packing tube 5. Ports 19, 20 lead from the ends of the cylindrical chamber 17 to the controlling cock 3 which controls connections between said ports and the inlet port 2 and an exhaust port 21 as will be readily understood from the drawing.

Using the terms "right" and "left" with reference to the parts as shown in the drawing, when the stop cock or controlling valve 3 is in the position shown in Fig. 1 the space in the chamber 17 at the left of the piston 16 is connected through the exhaust port 21 with the atmosphere so that the pressure is exhausted therefrom, and air is admitted through the port 20 into the chamber 17 at the right of the piston 16 which is thus forced to and retained at the left hand end of its stroke in the said chamber 17 as shown in Fig. 1. The nipple clamping appliances 5, 6, 7, 8, connected with said piston by the stem 15 are thus also in their left hand position relative to the sleeve 12, and the cam surfaces 10 of the clamping fingers are disengaged from the cam surface 11 of the sleeve 12, as shown in Fig. 1, leaving the spring fingers 9 free to expand outwardly so that the coupling member 4 may easily be inserted in the yielding packing tube 5. When the coupling member 4 has been thus inserted the controlling cock 3 is moved to the position shown in Fig. 2 thus connecting the ports 20, 21, and exhausting the air from the right hand side of the piston 16, while admitting air through the port 19 into the chamber 17 at the left hand side of said piston 16.

The air may flow from the chamber 17 through the passage 18 into the packing tube 5 and coupling member 4 inserted therein, but the passage 18 is of sufficiently small capacity to cause the pressure to rise rapidly in the chamber 17 at the left of the piston 16 and thus to force the piston to move toward the right from the position shown in Fig. 1, to that shown in Fig. 2. In this movement, the cam surfaces 10 at the ends of the fingers 9 are engaged by the cam surface 11 which forces said fingers radially inward and causes them to compress the packing tube 5 firmly against the outer surface of the coupling member 4 so as to make a tight joint therewith, so that the fluid which continues to flow through the passage 18 and tubular stem 15 will enter the coupling member 4 and hose connected therewith so as to exert a testing pressure therein.

After the test has been made, and it is desired to disconnect the appliance from the hose so that it may be readily applied to another similar hose to be tested, the controlling cock 3 is again moved to the position shown in Fig. 1 which permits air to exhaust from the chamber 17 at the left of the piston 16 and causes air to enter through the port 20 at the right of the piston 16 which is thus moved from right to left back to the position shown in Fig. 1. This releases the clamping fingers 9 leaving them free to expand, and while the fluid from the clamping tube 5 and hose may flow back through the passage 18 and thence escape to the air, the said passage 18 is so small that it does not immediately make a large reduction in the pressure in the hose the reaction of which thus serves to eject forcibly the coupling member 4 from the packing tube 5 as soon as the pressure of the spring fingers 9 thereon is relieved by the disengagement of the cam surfaces 10, 11. The coupling member 4 is thus promptly ejected and no pressure is then left in the packing tube 5 so that another coupling member may be readily inserted and thereafter tested by a repetition of the operations which have been described.

The automatic action of the clamping and sealing connection in response to the introduction and release or exhaust of the fluid by which the test is made renders the apparatus very convenient and quick operating, it being necessary only for the attendant to insert the coupling member of the hose to be tested and then to manipulate the handle of the stop cock 3, first to admit the fluid which effects the firm holding and sealing of the hose to be tested and the introduction of the testing fluid, after which the other movement of the stop cock automatically effects the release and ejection of the coupling member and prepares the apparatus for another coupling member to be inserted.

What I claim is:

1. A hose clamping and testing appliance comprising a yielding packing tube adapted to receive a hose coupling member within it, an expanding clamp coöperating with said tube, a cam coöperating with said clamp, and a piston connected with said clamp and adapted to be actuated by the fluid to be introduced for testing, the pressure of the fluid introduced operating automatically to cause the clamp to press the packing tube into engagement with the coupling member inserted therein, substantially as described.

2. A hose testing appliance comprising an expending clamp composed of spring fingers, and a packing tube surrounded thereby, and a cam for coöperating with said fingers to contract said clamp; a piston connected with said clamp; and a cylinder for said piston, and means for controlling the introduction and exhaust of fluid, to act upon said piston, and a communication from said cylinder through the interior of said clamp, whereby fluid pressure admitted to the cylinder actuates the piston to contract the clamp, and passes through said communication to the interior of the clamp and hose clamped therein.

3. In a hose testing appliance the combination of an expanding clamp with a piston connected with said clamp and a cylinder for said piston and means for controlling the introduction and exhaust of fluid to and from the ends of said cylinder and a communication from said cylinder to the interior of said clamp, whereby fluid admitted through one end of the cylinder actuates the piston to contract the clamp upon a coupling member inserted therein, and passes from said cylinder into said clamp and coupling member, and fluid admitted to the other end of said cylinder operates the piston to expand the clamp and permit the coupling member to be ejected therefrom by the fluid pressure contained therein substantially as described.

In testimony whereof, I have signed my name to this specification in the presence of two subscribing witnesses.

ROBERT SHEDROCK NEWTON.

Witnesses:
BLYTHE J. MINNIEE,
GENEVIEVE ALLARD.